United States Patent
Zhang (10) Patent No.: US 8,565,295 B1
(45) Date of Patent: Oct. 22, 2013

(54) LOW-COMPLEXITY CHANNEL NOISE REDUCTION METHOD AND APPARATUS FOR MULTI-CARRIER MODE IN WIRELESS LANS

(75) Inventor: Yun Zhang, Shanghai (CN)

(73) Assignee: Omnivision Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/597,207

(22) Filed: Aug. 28, 2012

(30) Foreign Application Priority Data

Apr. 13, 2012 (CN) .......................... 2012 1 0109447

(51) Int. Cl.
*H03K 5/159* (2006.01)
*H03H 7/30* (2006.01)
*H03H 7/40* (2006.01)

(52) U.S. Cl.
USPC ........... 375/231; 375/146; 375/229; 375/260; 375/295; 375/296

(58) Field of Classification Search
USPC .................. 375/231, 229, 260, 295, 296, 146
See application file for complete search history.

(56) References Cited

U.S. PATENT DOCUMENTS

| | | | |
|---|---|---|---|
| 6,377,631 B1 * | 4/2002 | Raleigh | 375/299 |
| 6,888,899 B2 * | 5/2005 | Raleigh et al. | 375/299 |
| 2003/0043887 A1 * | 3/2003 | Hudson | 375/144 |
| 2004/0141548 A1 * | 7/2004 | Shattil | 375/146 |

* cited by examiner

*Primary Examiner* — Ted Wang
(74) *Attorney, Agent, or Firm* — Blakely Sokoloff Taylor & Zafman (57) ABSTRACT

Low-complexity channel noise reduction method and apparatus for multi-carrier mode in wireless LANs are disclosed. The method selects an optimal frequency domain channel impulse response by using a known long training sequence and a highly protected signaling sequence of the multi-carrier mode frame structure to ensure the receiver to have a good operation threshold in different time-delay spread environments at the cost of a low complexity. Instead of detecting time domain channel responses, the method directly performs noise reduction to a noise-containing frequency domain channel by using preset Wiener filtering coefficients to obtain multiple frequency domain channel responses, among which there must be a relatively optimal frequency domain channel response. The relatively optimal frequency domain channel response can be selected by using the highly protected signaling sequence to calculate the signaling frequency domain channel.

2 Claims, 5 Drawing Sheets

FIG. 1

PRIOR ART

LOW-COMPLEXITY CHANNEL NOISE REDUCTION METHOD AND APPARATUS FOR MULTI-CARRIER MODE IN WIRELESS LANS

CROSS-REFERENCE TO RELATED APPLICATIONS

This application claims the priority of Chinese patent application number 201210109447.3, filed on Apr. 13, 2012, the entire contents of which are incorporated herein by reference.

TECHNICAL FIELD

The present invention relates to the field of wireless communications, and more particularly, to a low-complexity channel noise reduction method and apparatus used in multi-carrier mode in wireless local area networks (LANs).

BACKGROUND

In wireless communication systems, inevitable influence of terrains or obstacles on signals causes the occurrence of multipath distortion. As a time-varying channel impulse response is generally modeled as a time-domain discrete finite impulse response (FIR) filter denoted by $$h(\tau; t) = \sum_n a_n(t) e^{-j2\pi f_c \tau_n(t)} \delta(\tau - \tau_n(t)),$$

complex multipath interference always exists in received wideband signals, which appears as frequency selective fading in the frequency domain. For this reason, single-carrier systems usually employ time domain equalization to eliminate the multipath influence, which results in a very high complexity of receivers.

The orthogonal frequency division multiplexing (OFDM) technology has been widely used in wireless wideband communication systems. One significant advantage of OFDM technology is its capability of dividing a carrier with a relatively wide bandwidth into multiple parallel subcarriers, each subcarrier having a bandwidth far less than the coherence bandwidth of a channel. Therefore, the channel frequency fading that each subcarrier signal undergoes is flat, which overcomes the adverse effect of channel frequency selective fading. If channel frequency response characteristics at different subcarriers can be obtained by channel estimation technology, a receiver will be capable of realizing coherent demodulation to correctly recover transmitted signals. In order to improve demodulation threshold of the receiver and the quality of received signals, noise reduction is generally performed to the estimated channel response.

Wiener filtering is a commonly used channel noise reduction technology in multi-carrier OFDM systems. In consideration of the implementation complexity, Wiener filtering methods are usually designed according to several groups of preset channel power delay characteristics, and the corresponding Wiener filtering coefficients are stored. The receiver selects appropriate Wiener filtering methods and coefficients according to the preset channel power delay characteristic in the practical transmission environment. The above concept is applied in the China mobile multimedia broadcasting (CMMB) system to perform noise reduction and interpolation by selecting the most appropriate group of Wiener filtering coefficients through analyzing the multipath delay spread in a transmission channel. However, this method is only suitable for CMMB systems or the like, which adopt a low quadrature amplitude modulated (QAM) transmission mode, as the low QAM transmission mode is not sensitive to weak paths in reception environment, and ignorance or loss of several weak paths will not effect the determination of constellation points. Moreover, as the energy of noise in the environment where a low QAM reception is located is relatively high, it is advantageous for the reception threshold if some weak paths together with the noise are inhibited. With the increase of transmission rate, great QAM constellation points are more frequently used in practical systems, for example, the 64-QAM constellation points used in wireless LANs and the 256-QAM constellation points used in the European DVB-T2 system. These constellation points all have high demodulation thresholds, so that weak multipath in the transmission environment will have significant effect on their determination. Nevertheless, virtual carriers employed in OFDM systems that include cyclic prefix make weak paths of low energies sometimes be drowned in energy leakage of strong paths and cannot be easily detected, making the channel noise reduction of high QAM reception systems more difficult. In fact, the channel noise reduction process will lead to channel distortion while reducing the noise. As noise reduction is good for demodulation and channel distortion is bad for demodulation, the result of the channel noise reduction process is depended on the combined effect of the above two opposing effects.

Figure 1:
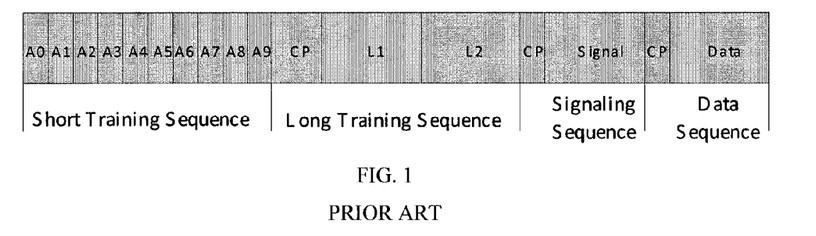
FIG. 1 is a schematic diagram of the frame structure of a multi-carrier mode in 802.11a/g systems of the prior art.

FIG. 1 illustrates the frame structure of a multi-carrier transmission mode in 802.11a/g systems. The frame consists of four parts wherein a first part is a short training sequence; a second part is a long training sequence; a third part is a signaling sequence; and a fourth part is a data sequence. The short training sequence is composed of 10 duplicate short training symbols and is mainly used for signal gain adjustment, signal capture and coarse estimation of carrier frequency offset. The following long training sequence is composed of 2.5 duplicate long training symbols and is mainly used for accurate estimation of carrier frequency offset, accurate timing synchronization of OFDM symbols and multipath estimation of transmission channel. The following signaling sequence is used for transmitting indication information which is necessary for the demodulation of the data sequence. Such indication information may include the length of the data sequence as well as the modulation mode used in transmission and the coding efficiency. Once the receiver obtains the above mentioned necessary information, it will be able to correctly demodulate and detect the data sequence.

In the 802.11a/g multi-carrier mode, channel estimation is accomplished during the period of receiving the long training sequence. The frequency domain channel response is obtained by dividing the received long training sequence by the locally stored frequency domain long training sequence. Since the frequency domain channel contains noise in most cases, if the channel is directly used for subsequent demodulation operation, it will result in a poor demodulation performance, therefore a noise reduction process is usually performed to the channel to improve operation threshold of system.

SUMMARY OF THE INVENTION

An objective of the present invention is to provide a low-complexity channel noise reduction method applicable for the 802.11a/g/n multi-carrier mode in wireless local area networks (LANs). The present invention selects an optimal frequency domain channel impulse response by using a known long training sequence portion and a highly protected signaling sequence portion of the multi-carrier mode frame structure to ensure the receiver to have a good operation threshold in environments with different time-delay spreads at the cost of a low complexity.

To achieve the above objective, the present invention provides a low-complexity channel noise reduction method for a multi-carrier transmission mode in a wireless local area network, the method includes:

divide a received frequency domain long training sequence by a locally stored long training sequence to obtain an original noise-containing frequency domain channel;

perform Wiener filtering to the original noise-containing frequency domain channel by using a plurality of groups of prestored Wiener filtering coefficients according to their corresponding filtering methods to obtain a plurality of groups of noise-reduced frequency domain channels;

perform equalization to received frequency domain signaling symbols by using a frequency domain channel response provided by the original noise-containing frequency domain channel, and demodulate, deinterleave and convolutionally decode the equalized signaling symbols to obtain effective signaling bits;

perform encoding, interleaving, modulation and OFDM framing to the obtained effective signaling bits according to the order at a transmitting end to obtain OFDM signaling symbols, and divide the received frequency domain signaling symbols by the OFDM signaling symbols to obtain a signaling frequency domain channel; and select a group of noise-reduced frequency domain channel that is closest to a response of the signaling frequency domain channel from the plurality of groups to be an optimal frequency domain channel.

To achieve the above objective, the present invention also provides a low-complexity channel noise reduction apparatus for a multi-carrier transmission mode in a wireless local area network. The apparatus includes a first sequence divider, a channel equalizer, a demodulator/deinterleaver/convolutional-decoder, a convolutional-encoder/interleaver/modulator, an OFDM framer, a second sequence divider, a Wiener filtering processer and a channel analyzer/selector, wherein the first sequence divider is configured to receive a frequency domain long training sequence and divide it by a locally stored long training sequence to obtain an original noise-containing frequency domain channel;

the channel equalizer is configured to receive frequency domain signaling symbols and perform channel equalization to the frequency domain signaling symbols with the original noise-containing frequency domain channel to obtain equalized signaling symbols;

the demodulator/deinterleaver/convolutional-decoder is configured to demodulate, deinterleave and convolutionally decode the equalized signaling symbols to obtain effective signaling bits;

the convolutional-encoder/interleaver/modulator and the OFDM framer are configured to perform convolutional encoding, interleaving, modulation and OFDM framing to the effective signaling bits to obtain OFDM signaling symbols;

the second sequence divider is configured to receive the frequency domain signaling symbols and dividing the frequency domain signaling symbols by the OFDM signaling symbols to obtain a signaling frequency domain channel;

the Wiener filtering processer is prestored with a plurality of groups of Wiener filtering coefficients and is configured to perform Wiener filtering to the obtained original noise-containing frequency domain channel by using filtering methods corresponding to the plurality of groups of Wiener filtering coefficients to obtain a plurality of groups of noise-reduced frequency domain channels; and the channel analyzer/selector is configured to select a group of noise-reduced frequency domain channel that is closest to a response of the signaling frequency domain channel from the plurality of groups to be an optimal frequency domain channel.

The present invention provides a low-complexity channel noise reduction method for multi-carrier transmission mode in 802.11a/g/n wireless LAN systems. The present invention selects the optimal frequency domain channel impulse response by using a known long training sequence portion and a highly protected signaling sequence portion of the multi-carrier mode frame structure to ensure the receiver to have a good operation threshold in environments with different time-delay spreads at the cost of a low complexity. Instead of detecting time domain channel responses, the method of the present invention directly performs noise reduction to a noise-containing frequency domain channel by using preset Wiener filtering coefficients to obtain multiple frequency domain channel responses, among which there must be a relatively optimal frequency domain channel response. The relatively optimal frequency domain channel response can be selected by using the highly protected signaling sequence to calculate the signaling frequency domain channel. The rule for selecting the optimal frequency domain channel response may be the minimization of mean square error (MSE).

DETAILED DESCRIPTION

The present invention will be described and specified below in combination with specific exemplary embodiments and accompanying drawings, so that the technical content of the present invention could be fully understood.

As described above, in general, a receiver selects appropriate Wiener filtering method and coefficients based on channel power time delay characteristics in a practical transmission environment. In other words, the receiver should estimate the time domain channel impulse response to detect multipath, however, weak multipath components always cannot be easily detected. In light of this, instead of selecting Wiener filtering coefficients by performing multipath detection to the time domain channel, the present invention first performs Wiener filtering to a noise-containing channel by using Wiener filtering methods corresponding to a plurality of groups of Wiener filtering coefficients prestored in the system, and then selects the group of Wiener filtering coefficients and the corresponding filtering method which can obtain the smallest mean square error (MSE) according to certain rule.

Specifically, the receiver first receives a time domain long training sequence and converts it into the frequency domain by fast Fourier transform (FFT) conversion to obtain a frequency domain long training sequence. The frequency domain channel response containing noise is obtained by dividing the obtained long training sequence by a locally stored frequency domain long training sequence. As a signaling sequence generally adopts highly protected transmission mode, while the protection for data sequence is relative weak to ensure high transmission efficiency, the method of the present invention includes: 1) perform equalization, demodulation, deinterleaving and decoding to the obtained signaling sequence to obtain signaling bits by directly using the noise-containing frequency domain channel response; 2) perform encoding, interleaving, modulation and framing to the obtained signaling bits according to the transmission mode at the transmitting end to obtain an ideal signaling symbol sequence; 3) divide the actually received frequency domain signaling symbols by the ideal signaling symbol sequence to obtain the frequency domain channel. Further, the noise-containing frequency domain channel is processed by using a plurality of preset Wiener filtering methods and coefficients to obtain noise-reduced frequency domain channel. In fact, due to the existence of weak paths in the transmission environment, the distortion of channel response will occur while reducing the noise, and therefore a channel analysis and selection module is used to select an optimal Wiener filtering coefficient and method to demodulate the following data sequence. This result is a good compromise between the noise reduction and channel distortion, which can ensure an appropriate operation threshold of the receiver in different transmission modes and different channel environments.

By introducing cyclic prefixes, a received signal in a multi-carrier orthogonal frequency division multiplexing (OFDM) system can be expressed as a cyclic convolution of a transmitted signal and a channel response, and correspondingly in the frequency domain, a received frequency domain signal can be expressed as the product of a transmitted frequency domain signal and a frequency domain channel response, namely, $R(k)=H(k)S(k)+N(k)$, where $R(k)$ is the received frequency domain sequence; $S(k)$ is a known frequency domain training sequence; $H(k)$ is the frequency domain channel response; $N(k)$ is white noise within transmission. Such feature enables easy implementations of channel estimation and channel equalization of OFDM systems. In the channel estimation, as the transmitted sequence $S(k)$ is known, we can get $$\hat{H}(k) = \frac{R(k)}{S(k)} - \frac{N(k)}{S(k)},$$

namely, the noise-containing frequency domain channel response can be obtained by dividing a received training sequence by a local training sequence; conversely, data symbols can be calculated by using the obtained frequency domain channel according to the formula $$S(k) = \frac{R(k)}{\hat{H}(k)} - \frac{N(k)}{\hat{H}(k)}$$

during data demodulation. For the transmission of multicarrier mode in 802.11a/g/n systems, as each element of the long training sequence and the signaling sequence has a value of +1 or −1, the division operation is just a simple symbol conversion operation.

As mentioned above, channel time delay spread is often used as a parameter to classify Wiener filtering, or in other words, the channel time delay spread parameters are classified by levels, and each level is corresponding to a group of Wiener filtering coefficients and filtering method. In a conventional method, the noise-containing frequency domain channel is converted into the time domain through the inverse fast Fourier transform (IFFT) conversion, and the obtained time domain channel is detected to obtain channel time delay spread so as to select optimal coefficients and their corresponding method. However, OFDM transmission systems employing cyclic prefixes usually include virtual carriers, which make it easier for spectrum shaping, but will simultaneously lead to the loss of high frequency portions of the frequency channel. Thus, the IFFT conversion is no longer a completely orthogonal conversion, which will lead to energy leakage. The energy originally concentrates on one subcarrier will scatter over all subcarriers, so that some weak multipath cannot be accurately detected.

Instead of detecting the time domain channel response, the method of the present invention directly performs noise reduction to a noise-containing frequency domain channel by using preset Wiener filtering coefficients to obtain multiple frequency domain channel responses where there will be a relatively optimal frequency domain channel response, and then selects the optimal frequency domain channel response using another frequency domain channel calculated by using subsequently received highly protected signaling sequence. The rule for selecting the optimal frequency domain channel response may be the minimization of mean square error (MSE).

Figure 2:
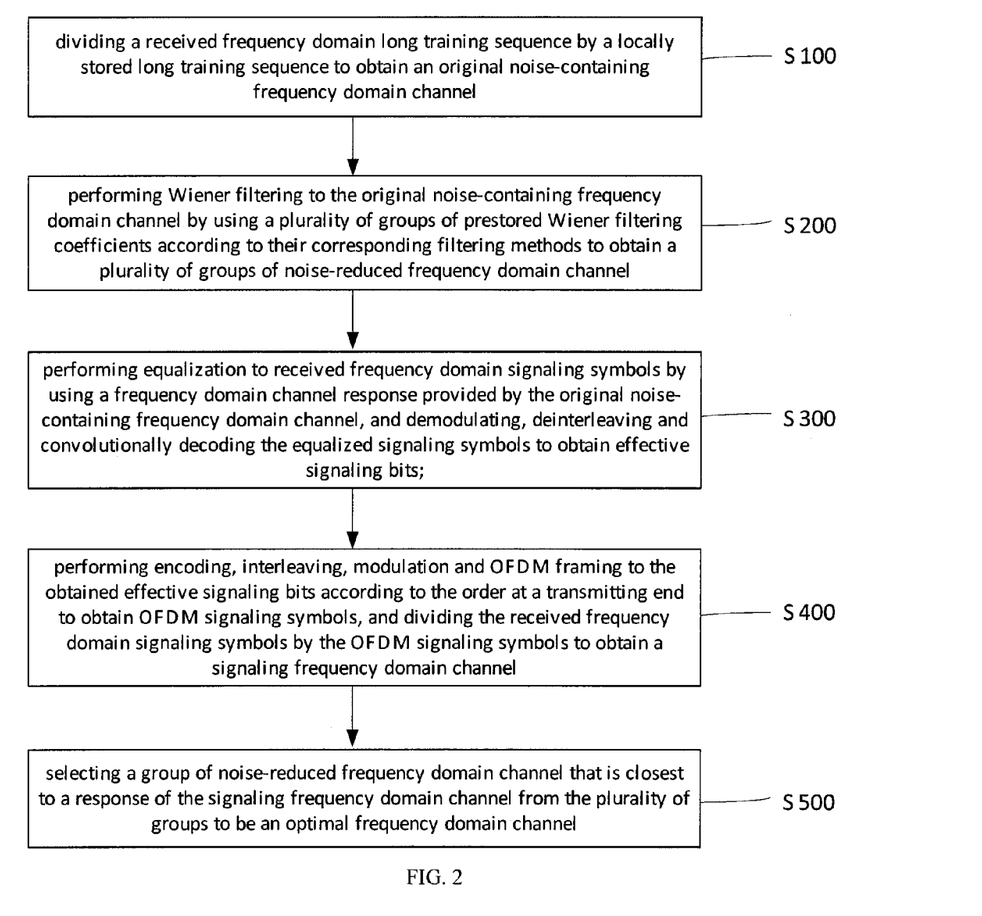
FIG. 2 is a flowchart illustrating the low-complexity channel noise reduction method of a preferred embodiment according to the present invention.

Referring to FIG. 2, the present invention provides a low-complexity channel noise reduction method for a multi-carrier mode in a wireless LAN, the method is detail described as follows:

Step S100: divide a received frequency domain long training sequence by a locally stored long training sequence to obtain an original noise-containing frequency domain channel, wherein the long training sequence is composed of +1's and −1's, therefore the sequence division operation is just a sequence multiplication operation.

Step S200: perform Wiener filtering to the original noise-containing frequency domain channel by using a plurality of groups of prestored Wiener filtering coefficients according to their corresponding filtering methods to obtain a plurality of groups of noise-reduced frequency domain channels; in the noise reduction process, some noise may still remain and a portion of channel distortion may occur.

Step S300: perform equalization to received frequency domain signaling symbols by using a frequency domain channel response provided by the original noise-containing frequency domain channel, and demodulate, deinterleave and convolutionally decode the equalized signaling symbols to obtain effective signaling bits;

Step S400: perform encoding, interleaving, modulation and OFDM framing to the obtained effective signaling bits according to the order at a transmitting end to obtain OFDM signaling symbols. Since the signaling symbols are more highly protected than the data symbols, it is convinced that the actually received OFDM signaling symbols are correct. Then, divide the received frequency domain signaling symbols by the OFDM signaling symbols to obtain a signaling frequency domain channel, wherein the OFDM signaling symbols and the received frequency domain signaling symbols are both composed of +1's and −1's, therefore the sequence division operation is just a sequence multiplication operation.

Step S500: select a group of noise-reduced frequency domain channel that is closest to a response of the signaling frequency domain channel from the plurality of groups to be an optimal frequency domain channel.

Figure 3:
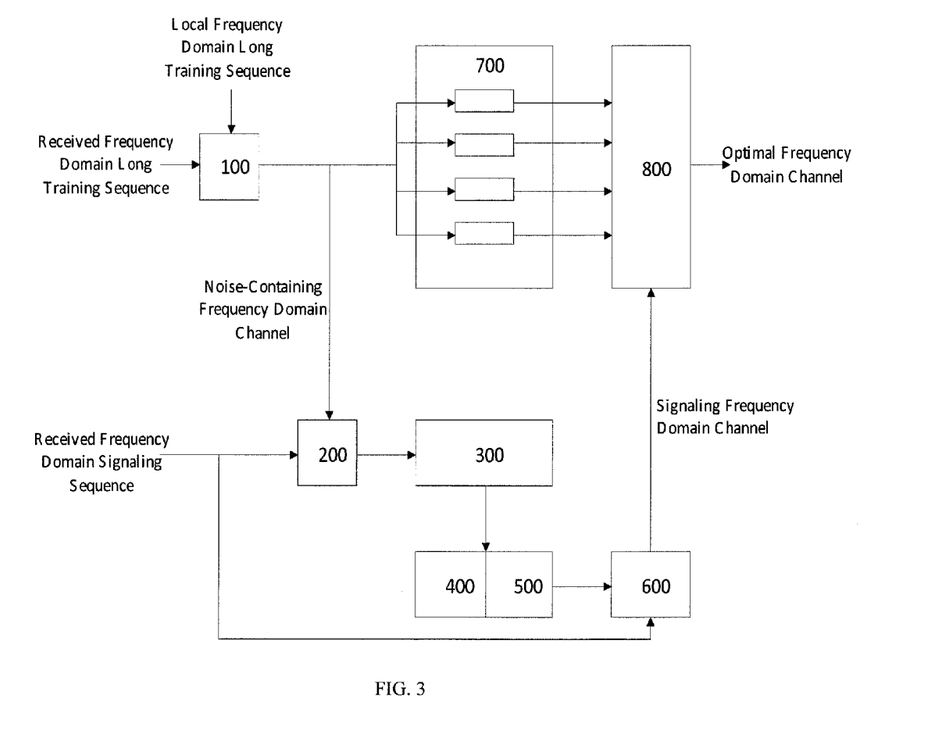
FIG. 3 is a schematic diagram of the low-complexity channel noise reduction apparatus of a preferred embodiment according to the present invention.

Referring to FIG. 3, FIG. 3 is a schematic diagram of the low-complexity channel noise reduction apparatus according to a preferred embodiment of the present invention. The embodiment provides a low-complexity channel noise reduction apparatus for a multi-carrier transmission mode in a wireless LAN, the apparatus includes: a first sequence divider 100, a channel equalizer 200, a demodulator/deinterleaver/convolutional-decoder 300, a convolutional-coder/interleaver/modulator 400, an OFDM framer 500, a second sequence divider 600, a Wiener filtering processor 700 and a channel analyzer/selector 800, wherein, the first sequence divider 100 is configured to receive a frequency domain long training sequence and divide it by a locally stored long training sequence to obtain an original noise-containing frequency domain channel;

the channel equalizer 200 is configured to receive frequency domain signaling symbols and perform channel equalization to the frequency domain signaling symbols with the original noise-containing frequency domain channel to obtain equalized signaling symbols;

the demodulator/deinterleaver/convolutional-decoder 300 is configured to demodulate, deinterleave and convolutionally decode the equalized signaling symbols to obtain effective signaling bits;

the convolutional-encoder/interleaver/modulator 400 and the OFDM framer 500 are configured to perform convolutional encoding, interleaving, modulation and OFDM framing to the effective signaling bits to obtain OFDM signaling symbols;

the second sequence divider 600 is configured to receive the frequency domain signaling symbols and dividing the frequency domain signaling symbols by the OFDM signaling symbols to obtain a signaling frequency domain channel;

the Wiener filtering processor 700 is prestored with a plurality of groups of Wiener filtering coefficients and is configured to perform Wiener filtering to the obtained original noise-containing frequency domain channel by using filtering methods corresponding to the plurality of groups of Wiener filtering coefficients to obtain a plurality of groups of noise-reduced frequency domain channels;

the channel analyzer/selector 800 is configured to select a group of noise-reduced frequency domain channel that is closest to a response of the signaling frequency domain channel from the plurality of groups to be an optimal frequency domain channel.

A multi-carrier OFDM transmission mode in 802.11a/g systems is taken for example to describe the whole process of the present invention. In 802.11a/g systems, each OFDM symbol has a protection interval of 0.8 μs. Normally, channel time delay spreads are considered not to exceed 0.8 μs. In this embodiment, a multipath channel model having three paths is employed, as specified in the following Table 1.

TABLE 1 the multipath channel model employed in this embodiment

| Parameter of the channel model | First path | Second Path | Third Path |
| --- | --- | --- | --- |
| Time delay (us) | 0 | 0.5 | 0.7 |
| Power (dB) | 0 | −25 | −25 |

Figure 4:
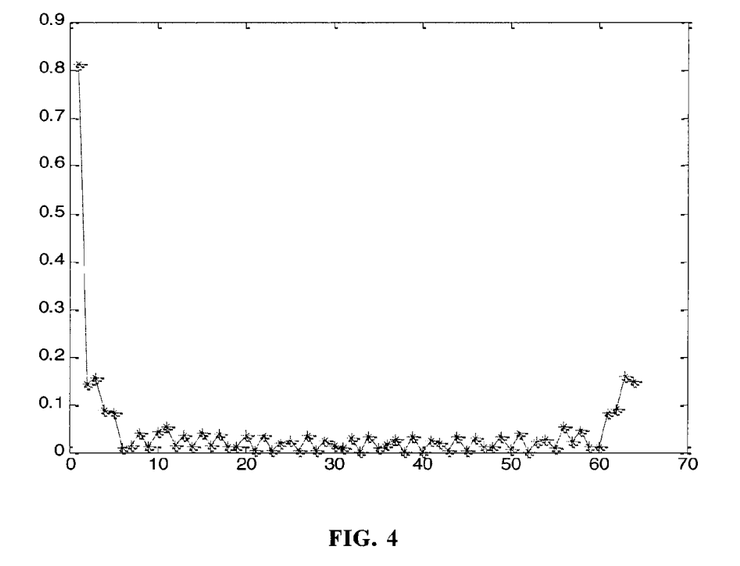
FIG. 4 is a schematic diagram of a time-domain channel impulse response obtained based on the long training sequence.

As shown in the above table, the first path is a major path of the transmission model; the power of either the second path or the third path is 25 dB lower than that of the first path; the delays of the second path and the third path are 0.5 μs and 0.7 μs, respectively. It can be easily found from FIG. 4 that the second path and the third path cannot be detected based on time domain channel responses since the weak paths are drowned by the energy leaked from the major path. The present invention will be further specified below in combination with two different transmission environments.

The present invention first obtains a noise-containing frequency domain channel response by using two complete long training symbols included in a long training sequence. In order to clearly describe the intend of the present invention, Wiener filtering adopted below is classified into two settings with respect to channel time delay spread, wherein a first setting of Wiener filtering is a low-pass filtering for processing the single major path; a second setting of Wiener filtering is selected to be a low-pass filtering with a passband of 0.8 μs. The transmission modes of data sequence are respectively set as 64-QAM mode and 4-QAM mode to describe the effects of the present invention.

Figure 5:
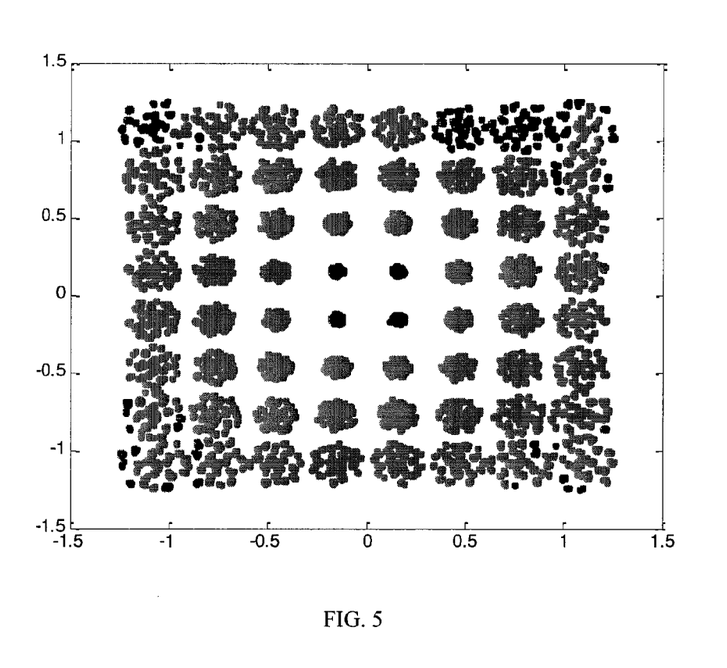
FIGS. 5 to 8 are schematic diagrams of received constellation points after Wiener filtering process.
Figure 6:
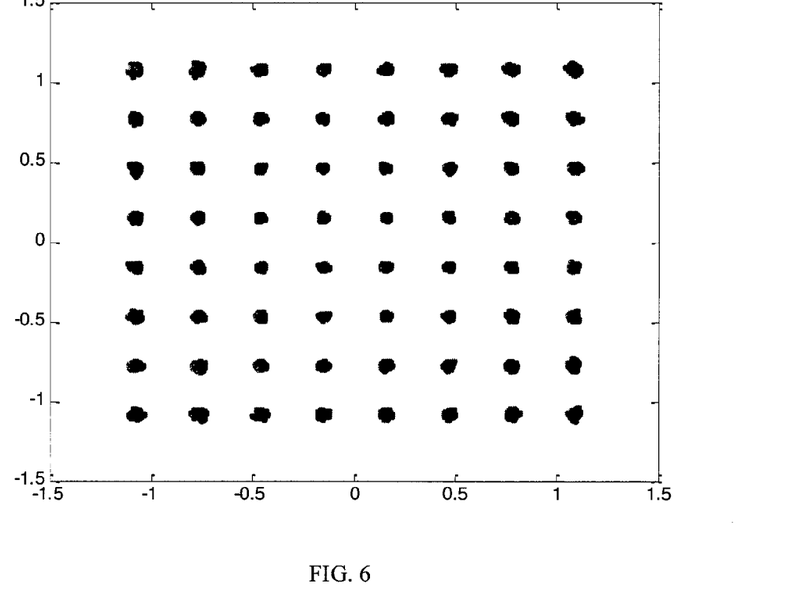

(1) The data sequence is transmitted in the 64-QAM mode, and the signal to noise ratio (SNR) is 35 dB. If only the major path instead of weak paths is taken into account, the first setting of Wiener filtering will be adopted. The corresponding received constellation points are as shown in FIG. 5. From FIG. 5 we can see that the 64-QAM constellation diagram is very ambiguous. In fact, the second setting of Wiener filtering for this case can obtain a good result as shown in FIG. 6, with which the determination can be correctly achieved. The method of the present invention can select the second setting of Wiener filtering automatically in this case. Therefore, the weak multipath components should be taken into account when the SNR condition is fairly good.

Figure 7:
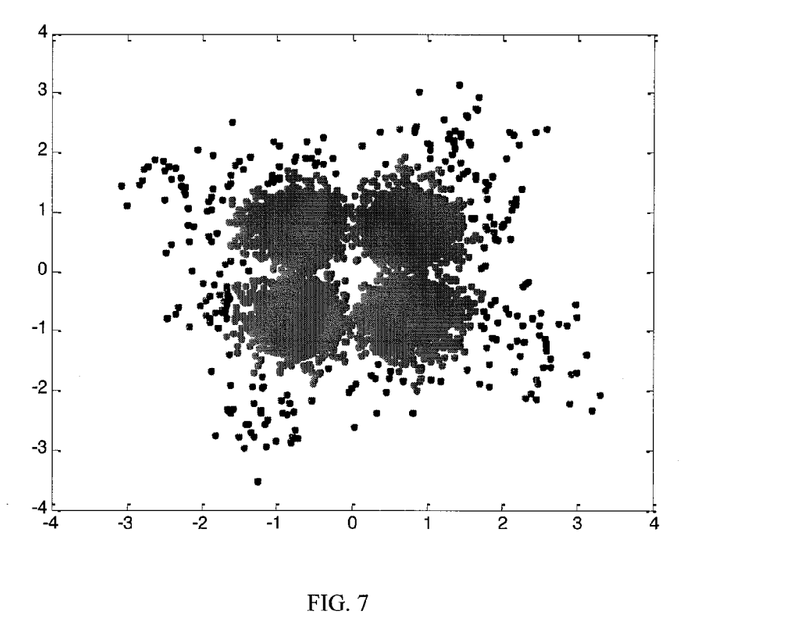
Figure 8:
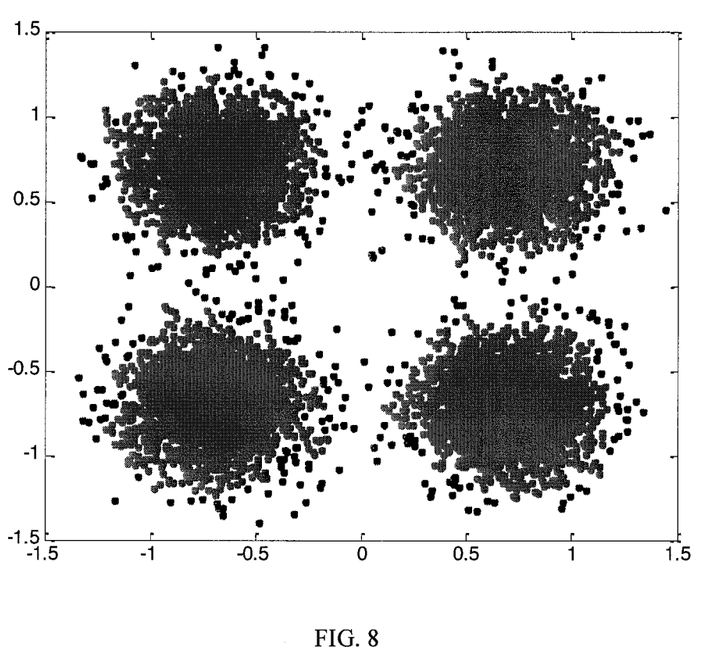

(2) The data sequence is transmitted in the 4-QAM mode, and the signal to noise ratio (SNR) is 6 dB. If all the multipath components are taken into account, the second setting of Wiener filtering will be adopted, and the corresponding constellation points are as shown in FIG. 7. For this case, the method of the present invention selects the results of the first setting of Wiener filtering to be the optimal frequency domain channel, and the received constellation points are as shown in FIG. 8. It can be easily found that the method of the present invention is capable of achieving a good noise reduction effect and the constellation points are clearer. Thus, in a bad SNR condition, the noise reduction process should reduce the energy of noise as much as possible, and the ignorance of weak multipath components will lead to an improved reception performance.

For the above two conditions, it is clear that the channel noise reduction method of the present invention is capable of automatically achieving a compromise between noise reduction and channel distortion, which is capable of obtaining good results in different transmission modes and conditions.

Numerous embodiments with great variations can be made without departing from the spirit and scope of the invention. It will be understood that specific embodiments described in the specification shall not be intended to limit the scope of the invention which shall solely be limited by the appended claims.

What is claimed is:

1. A low-complexity channel noise reduction method for a multi-carrier mode in a wireless local area network, comprising the following steps:

dividing a received frequency domain long training sequence by a locally stored long training sequence to obtain an original noise-containing frequency domain channel;

performing Wiener filtering to the original noise-containing frequency domain channel by using a plurality of groups of prestored Wiener filtering coefficients according to their corresponding filtering methods to obtain a plurality of groups of noise-reduced frequency domain channels;

performing equalization to received frequency domain signaling symbols by using a frequency domain channel response provided by the original noise-containing frequency domain channel, and demodulating, deinterleaving and convolutionally decoding the equalized signaling symbols to obtain effective signaling bits;

performing encoding, interleaving, modulation and OFDM framing to the obtained effective signaling bits according to the order at a transmitting end to obtain OFDM signaling symbols, and dividing the received frequency domain signaling symbols by the OFDM signaling symbols to obtain a signaling frequency domain channel; and selecting a group of noise-reduced frequency domain channel that is closest to a response of the signaling frequency domain channel from the plurality of groups to be an optimal frequency domain channel.

2. A low-complexity channel noise reduction apparatus for a multi-carrier mode in a wireless local area network, comprising a first sequence divider, a channel equalizer, a demodulator/deinterleaver/convolutional-decoder, a convolutional-encoder/interleaver/modulator, an OFDM framer, a second sequence divider, a Wiener filtering processor and a channel analyzer/selector, wherein the first sequence divider is configured to receive a frequency domain long training sequence and divide it by a locally stored long training sequence to obtain an original noise-containing frequency domain channel;

the channel equalizer is configured to receive frequency domain signaling symbols and perform channel equalization to the frequency domain signaling symbols with the original noise-containing frequency domain channel to obtain equalized signaling symbols;

the demodulator/deinterleaver/convolutional-decoder is configured to demodulate, deinterleave and convolutionally decode the equalized signaling symbols to obtain effective signaling bits;

the convolutional-encoder/interleaver/modulator and the OFDM framer are configured to perform convolutional encoding, interleaving, modulation and OFDM framing to the effective signaling bits to obtain OFDM signaling symbols;

the second sequence divider is configured to receive the frequency domain signaling symbols and dividing the frequency domain signaling symbols by the OFDM signaling symbols to obtain a signaling frequency domain channel;

the Wiener filtering processer is prestored with a plurality of groups of Wiener filtering coefficients and is configured to perform Wiener filtering to the obtained original noise-containing frequency domain channel by using filtering methods corresponding to the plurality of groups of Wiener filtering coefficients to obtain a plurality of groups of noise-reduced frequency domain channels; and the channel analyzer/selector is configured to select a group of noise-reduced frequency domain channel that is closest to a response of the signaling frequency domain channel from the plurality of groups to be an optimal frequency domain channel.

* * * * *